(12) United States Patent
Holtgrewe et al.

(10) Patent No.: US 10,787,536 B2
(45) Date of Patent: Sep. 29, 2020

(54) CATALYST COMPOSITION FOR CURING RESINS CONTAINING EPOXY GROUPS

(71) Applicant: Henkel AG & Co. KGaA, Duesseldorf (DE)

(72) Inventors: Christian Holtgrewe, Duesseldorf (DE); Harald Kuester, Duesseldorf (DE); Thomas Bachon, Duesseldorf (DE); Rainer Schoenfeld, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/624,944

(22) Filed: Jun. 16, 2017

(65) Prior Publication Data

US 2017/0283543 A1   Oct. 5, 2017

Related U.S. Application Data

(63) Continuation of application No. PCT/EP2015/080469, filed on Dec. 18, 2015.

(30) Foreign Application Priority Data

Dec. 22, 2014   (DE) .................. 10 2014 226 842

(51) Int. Cl.
| | | |
|---|---|---|
| *C08G 18/20* | (2006.01) | |
| *C08G 18/48* | (2006.01) | |
| *C08G 18/00* | (2006.01) | |
| *C08G 18/76* | (2006.01) | |
| *C08G 59/68* | (2006.01) | |

(52) U.S. Cl.
CPC ....... *C08G 18/2027* (2013.01); *C08G 18/003* (2013.01); *C08G 18/4825* (2013.01); *C08G 18/7664* (2013.01); *C08G 18/7671* (2013.01); *C08G 59/686* (2013.01)

(58) Field of Classification Search
CPC ............. C08G 18/2027; C08G 18/003; C08G 18/4825; C08G 18/7664; C08G 18/7671; C08G 59/686
USPC .......................................................... 528/93
See application file for complete search history.

(56) References Cited

U.S. PATENT DOCUMENTS

| | | |
|---|---|---|
| 3,424,719 A | 1/1969 | Masters |
| 3,635,894 A | 1/1972 | Dowbenko et al. |
| 4,129,554 A | 12/1978 | Karasawa et al. |
| 4,138,372 A | 2/1979 | Nishikawa et al. |
| 4,564,651 A * | 1/1986 | Markert ............... C08G 18/003 427/116 |
| 4,631,306 A | 12/1986 | Markert et al. |
| 4,680,222 A | 7/1987 | Anton |
| 5,036,135 A | 7/1991 | von Gentzkow et al. |
| 5,194,502 A | 3/1993 | Saito et al. |
| 5,223,596 A | 6/1993 | Okawa et al. |
| 5,266,662 A | 11/1993 | Jakob et al. |
| 5,288,833 A | 2/1994 | Parodi et al. |
| 5,314,983 A | 5/1994 | DeMeuse et al. |
| 6,670,006 B1 | 12/2003 | Sugimori et al. |
| 2009/0030158 A1 | 1/2009 | Amano et al. |
| 2010/0311916 A1 | 12/2010 | Tzou et al. |
| 2011/0160327 A1 | 6/2011 | Occhielio et al. |
| 2012/0214958 A1 | 8/2012 | Marks |
| 2013/0109829 A1 | 5/2013 | Yokoyama |
| 2014/0037966 A1 | 2/2014 | Renkel et al. |
| 2014/0039118 A1 * | 2/2014 | Renkel ................... C09J 175/04 524/590 |
| 2014/0256909 A1 * | 9/2014 | Marks .................... C08G 59/24 528/406 |
| 2015/0218375 A1 | 8/2015 | Hupka et al. |
| 2015/0361331 A1 | 12/2015 | Tanguay et al. |

FOREIGN PATENT DOCUMENTS

| | | |
|---|---|---|
| EP | 0444956 A2 | 9/1991 |
| GB | 1447500 A | 8/1976 |
| JP | 7233233 A | 9/1995 |
| JP | 2000007891 A | 1/2000 |
| JP | 2010529229 A | 8/2010 |
| JP | 2011500950 A | 1/2011 |
| JP | 2012062448 A2 | 3/2012 |
| JP | 2012229371 A | 11/2012 |
| WO | 9015089 A1 | 12/1990 |
| WO | 9211304 A1 | 7/1992 |
| WO | 0034351 A1 | 6/2000 |
| WO | 2007096216 A1 | 8/2007 |
| WO | 2008110602 A1 | 9/2008 |

(Continued)

OTHER PUBLICATIONS

Wittenbecher et al., WO 2008/152004 A1 machine translation in English, Dec. 18, 2008 (Year: 2008).*
International Search Report for International application PCT/EP2015/080469, dated Apr. 5, 2016. All references cited in the International Search Report are listed herein.
German Search Report for DE 102014226842.7. All references cited in the German Search Report are listed herein. 2016.
Lee H. & Neville, K. Handbook of Epoxy, McGraw-Hill Book Company, Neuauflage von 1982.
German Search Report for DE 102014226842.7. All references cited in the German Search Report have previously been made of record, 2016.

(Continued)

*Primary Examiner* — David T Karst
(74) *Attorney, Agent, or Firm* — Mary K. Cameron

(57) ABSTRACT

The present invention relates to a catalyst composition for curing resins containing epoxy groups, in particular epoxy/polyurethane hybrid resins, the catalyst composition containing an imidazolium salt, in addition to a base, as well as a method for curing such resins in the presence of the catalyst composition, to the use of the catalyst composition for curing resins containing epoxy groups, to resin systems comprising a resin containing epoxy groups and the catalyst composition, and to a dosing system that comprises the resin and the catalyst composition.

10 Claims, No Drawings

(56) References Cited

FOREIGN PATENT DOCUMENTS

| WO | 2008152004 A1 | 12/2008 | |
|---|---|---|---|
| WO | 2009045835 A1 | 4/2009 | |
| WO | WO-2012139975 A1 * | 10/2012 | ............. B29C 43/12 |
| WO | 2014106578 A1 | 7/2014 | |

OTHER PUBLICATIONS

Lee H. & Neville, K. Handbook of Epoxy, Mc-Graw-Hill Book Company, Neuauflage von 1982. Cited in the specification on p. 9, paragraph [0048].

International Search Report for International PCT Patent Application No. PCT/EP2015/080470 dated Mar. 11, 2016.
Dietrich Braun et al., "Poly-2-oxazolidinone aus Isocyanaten und Epoxiden", Die Angewandte Makromolekulare Chemie, 1979, 78, 1-19.
Rashmi Mohan Mathur et al., "Synthesis and characterization of oxazolidones with improved thermal stability", Advances in Applied Science Research, 2012, 3, (5):2553-2560.
Marjorie Flores et al., "Curing and Characterization of Oxazolidone-Isocyanurate-Ether Networks", Journal of Applied Polymer Science, 2012, 125, 2779-2789.
Dow Product Information, D.E.R. 331 Liquid Epoxy Resin, Appendix 1, 5 pages, 2000.

* cited by examiner

CATALYST COMPOSITION FOR CURING RESINS CONTAINING EPOXY GROUPS

The present invention relates to a catalyst composition for curing resins containing epoxy groups, in particular epoxy/polyurethane hybrid resins, a method for curing these resins using the catalyst composition, the use of said catalyst composition for curing resins containing epoxy groups as well as a dosing system which comprises the resin and the catalyst composition.

Resins containing epoxy groups are established in the prior art as starting materials for plastics. In conventional production processes, these resins are cured at room temperature by means of catalysts. The catalysts in use at present have very different curing times. For example, aliphatic amines cure resins containing epoxy groups in a period of less than one minute, whereas imidazole and imidazole derivatives need a few hours to cure such resins completely.

The named, conventional catalyst systems are disadvantageous in particular in resin transfer molding (RTM) as, with short curing times of less than a minute, the resin cures either already before it completely fills the mold, or already in the nozzles of the manufacturing plant.

Longer curing times of several hours are, in contrast, less economical as they involve long production times and the molds used for the process are not available at this time.

Although the curing times can be regulated at least partially by the quantities of catalyst, it is known that both increasing and decreasing the quantities of catalyst used can have a negative impact on the physical properties of the obtained plastics such as for example the glass transition temperature.

Therefore, the general aim exists to develop catalysts which cure resins containing epoxy groups within a time which is adequate in terms of manufacturing technology and simultaneously process economy, preferably in the range of a few minutes, with the result that on the one hand, a complete draining of the molds with the resin/catalyst mix and on the other hand, the shortest possible molding cycle time of the process can be achieved.

It has now surprisingly been found that catalyst compositions which contain (i) at least one ionic imidazolium compound and (ii) at least one base, in particular a non-ionic base which comprises a tertiary nitrogen atom and/or an imine nitrogen, cure resins containing epoxy groups within a few minutes. In other words, the inventors have identified that by mixing ionic imidazolium compounds and suitable bases, i.e. in particular non-ionic bases containing nitrogen, the curing times provided by the imidazole compounds can be shortened.

Therefore, in a first aspect, the present invention relates to a catalyst composition for curing a resin containing epoxy groups, in particular an epoxy/polyurethane hybrid resin, comprising:
(i) at least one ionic compound of formula (I)

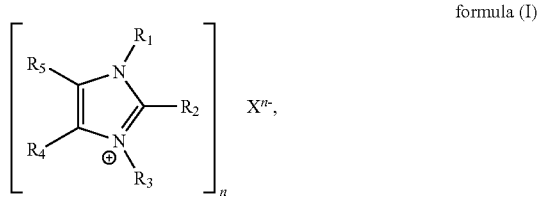

formula (I)

wherein
$R_1$ and $R_3$ are in each case selected independently of one another from the group consisting of substituted or unsubstituted, linear or branched alkyl having 1 to 20, in particular 1 to 10, carbon atoms, substituted or unsubstituted, linear or branched alkenyl having 3 to 20 carbon atoms and substituted or unsubstituted aryl having 5 to 20, in particular 5 to 10, carbon atoms;

$R_2$ is hydrogen;

$R_4$ and $R_5$ are in each case selected independently of one another from the group consisting of hydrogen, substituted or unsubstituted, linear or branched alkyl having 1 to 20 carbon atoms, substituted or unsubstituted, linear or branched alkenyl having 3 to 20 carbon atoms, substituted or unsubstituted, linear or branched alkoxy having 1 to 20 carbon atoms and substituted or unsubstituted aryl having 5 to 10 carbon atoms, in particular hydrogen;

or $R_1$ and $R_5$ and/or $R_3$ and $R_4$ or $R_4$ and $R_5$, together with the carbon or nitrogen atoms to which they are bonded, form a 5-6 membered substituted or unsubstituted cycloalkyl-, cycloheteroalkyl-, aryl- or heteroaryl ring, wherein the cycloheteroalkyl- or heteroaryl ring contains 1 to 3 heteroatoms selected from O, N and S;

X is any anion;

== is a single or double bond, in particular a double bond;

n is 1, 2 or 3; and (ii) at least one base, in particular a non-ionic base which contains nitrogen, wherein the base comprises preferably at least one tertiary nitrogen atom and/or an imine nitrogen atom.

It has been found that using the catalyst compositions according to the invention in transfer molding methods is particularly advantageous because of the curing time, as the resins cure neither too quickly (i.e. in <1 min) nor too slowly (i.e. in >30 min). This enables an optimum filling or draining of the mold or chamber in which the resin is cured, and the filling nozzles of the manufacturing plants avoid becoming blocked. Additionally, the catalyst composition cures the resin sufficiently quickly (<30 min), with the result that the filled mold or chamber in which the resin cures is not occupied for too long and is more quickly made available again in the manufacturing process. Additionally, the manufacturing plant can be better used to capacity, which leads to a higher operation throughput and cost savings. In contrast with plastic which cure very quickly (<1 min), the plastic obtained in this way has fewer defects and thus a higher quality with regard to physical properties, such as for example with regard to the glass transition temperature and mechanical stability. A pot life of 2 to 10 minutes is particularly advantageous.

In a further aspect, the present invention is directed to a method for curing a resin containing epoxy groups, in particular an epoxy/polyurethane hybrid resin, wherein the resin is brought into contact with the catalyst composition described herein, under conditions which enable curing.

In yet another aspect, the present invention relates to the use of the catalyst composition as described herein for curing a resin containing epoxy groups, in particular an epoxy/polyurethane hybrid resin.

The invention also relates to a polymer composition which contains at least one resin containing epoxy groups, in particular an epoxy/polyurethane hybrid resin, and a catalyst composition according to the invention.

Finally, in yet another aspect, the present invention is directed to a dosing system which comprises at least one resin containing epoxy groups, in particular an epoxy/ polyurethane hybrid resin, as well as the catalyst composition described herein, wherein the catalyst composition and the resin are contained in separate containers. In preferred embodiments, this dosing system can also comprise a dosing device.

"At least one", as used herein, relates to 1 or more, for example 1, 2, 3, 4, 5, 6, 7, 8, 9 or more. In conjunction with constituents of the catalyst compositions described herein, this information relates not to the absolute quantity of molecules, but to the type of constituent. "At least one ionic compound" therefore means for example one or more different ionic compounds, i.e. one or more different types of ionic compounds. Together with quantity details, the quantity details relate to the overall quantity of the correspondingly named type of constituent as already defined above.

The catalyst composition according to the invention for curing a resin containing epoxy groups, in particular an epoxy/polyurethane hybrid resin, comprises at least one ionic compound of formula (I)

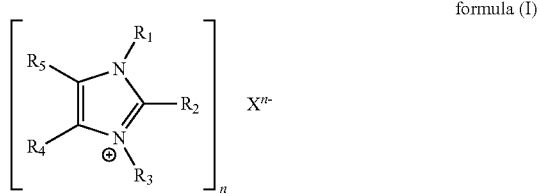

formula (I)

$R_1$ and $R_3$ in formula (I) are in each case selected independently of one another from the group which consists of substituted or unsubstituted, linear or branched alkyl having 1 to 20 carbon atoms, substituted or unsubstituted, linear or branched alkenyl having 3 to 20 carbon atoms and substituted or unsubstituted aryl having 5 to 20 carbon atoms. Preferably, $R_1$ and $R_3$ are chosen from the group consisting of substituted or unsubstituted, linear or branched alkyl having 1 to 10 carbon atoms and substituted or unsubstituted aryl having 5 to 10 carbon atoms.

The radicals $R_4$ and $R_5$ are in each case selected independently of one another from the group consisting of hydrogen, substituted or unsubstituted, linear or branched alkyl having 1 to 20 carbon atoms, substituted or unsubstituted, linear or branched alkenyl having 3 to 20 carbon atoms, substituted or unsubstituted, linear or branched alkoxy having 1 to 20 carbon atoms and substituted or unsubstituted aryl having 5 to 10 carbon atoms. In formula (I), $R_4$ and $R_5$ are preferably hydrogen.

In different embodiments, $R_1$ and $R_5$ and/or $R_3$ and $R_4$ or $R_4$ and $R_5$, together with the carbon or nitrogen atoms to which they are bonded, can form a 5-6 membered substituted or unsubstituted cycloalkyl-, cycloheteroalkyl-, aryl- or heteroaryl ring, wherein the cycloheteroalkyl- or heteroaryl ring contains 1 to 3 heteroatoms selected from O, N and S. In specific embodiments therefore, both $R_1$ and $R_5$ and also $R_3$ and $R_4$ can combine with one another to form a ring. However, it is preferred that $R_4$ and $R_5$ combine with one another, in particular to form a 6-membered aryl ring, with the result that the resulting compound is a benzimidazolium or a benzimidazolidinium.

The anion X of formula (I) can be any anion which is known and suitable for the purpose according to the invention and can serve merely to equalize the charge of the cation of the ionic compound of formula (I). It can be advantageous if the anion does not have any chelating properties. In a preferred embodiment, X is selected from the group consisting of dicyandiamide anion, $F^-$, $Cl^-$, $Br^-$, $OH^-$, $HSO_3^-$, $SO_3^{2-}$, $SO_4^{2-}$, $NO_2^-$, $NO_3^-$, $PO_4^{3-}$, $BF_4^-$, $PF_6^-$, $ClO_4^-$, acetate, citrate, formate, glutarate, lactate, malate, malonate, oxalate, pyruvate, tartrate, cyanamide, $SCN^-$ and $P(OEt)_2O_2^-$. In a particularly preferred embodiment, X is selected from the group consisting of $Cl^-$, $Br^-$, $I^-$, $SO_4^{2-}$, $NO_2^-$, $NO_3^-$, $PO_4^{3-}$, $BF_4^-$, $SbF_6^-$, $PF_6^-$, $ClO_4^-$, acetate, cyanamide, $SCN^-$ and $P(OEt)_2O_2^-$.

The number n is 1, 2 or 3.

The catalyst composition described herein can contain several different ionic compounds of formula (I).

"Alkyl", as used herein, relates to linear or branched alkyl groups, such as for example methyl, ethyl, n-propyl and isopropyl. The alkyl residues can be substituted or unsubstituted, but are preferably unsubstituted. If they are substituted, the substitutes are in particular selected from the group consisting of $C_{6-14}$-aryl, —OR, —NRR', wherein R and R' can each independently be H or unsubstituted $C_{1-10}$ alkyl.

"Alkenyl", as used herein, relates to linear or branched alkenyl groups which contain at least one C=C double bond such as for example ethenyl, n-propenyl, isopropenyl and n-butenyl. The alkylenyl residues can be substituted or unsubstituted, but are preferably unsubstituted. If they are substituted, the substitutes are in particular selected from the group consisting of $C_{6-14}$-aryl, —OR, —NRR', wherein R and R' can each independently be H or unsubstituted $C_{1-10}$ alkyl.

"Aryl", as used herein, relates to aromatic groups which can have at least one aromatic ring, but also several condensed rings such as for example phenyl, naphthyl, anthracenyl and the like. The aryl residues can be substituted or unsubstituted. If they are substituted, the substitutes are selected from the group consisting of $C_{1-10}$-alkyl, $C_{2-10}$ alkenyl —OR, —NRR', wherein R and R' can each independently be H or unsubstituted $C_{1-10}$ alkyl.

In different embodiments of the invention, the compound of formula (I) is a 1,3-substituted imidazolium compound, i.e. $R_2$, $R_4$ and $R_5$ are hydrogen. The substitutes $R_1$ and $R_3$ are preferably selected from unsubstituted $C_{1-4}$-alkyl residues, in particular methyl and ethyl, i.e. the compounds are for example 1-ethyl-3-methyl-imidazolium compounds, or from unsubstituted or substituted $C_6$-aryl residues, in particular phenyl substituted with one or more $C_{1-4}$ alkyl substitutes, such as for example 2,6-diisopropylphenyl.

The anion can in particular be acetate, chloride, thiocyanate, diethyl phosphate or cyanocyanamide.

In different embodiments, the compound of formula (I) is selected from 1-ethyl-3-methyl-1H-imidazolium acetate, 1-ethyl-3-methyl-1H-imidazolium thiocyanate, 1-ethyl-3-methyl-1H-imidazolium cyanocyanamide, 1-ethyl-3-methyl-1H-imidazolium diethyl phosphate and 1,3-bis(2,6-diisopropylphenyl)-1H-imidazolidinium chloride.

Furthermore, the catalyst composition according to the invention comprises at least one base. In preferred embodiments, the base has a basicity which is sufficient to deprotonate the 2-position of the compound of formula (I) under service conditions. This means that the base has a corresponding acid with an acid constant pKs which is greater than the acid constant of the H atom in position 2 of the compound of formula (I) (pKs (base)>pKs (compound formula (I)). The difference in the acid constant is preferably at least 1. In different embodiments, the corresponding acid of the base has a pKs of 10 or more, in particular 12-14 or more. "Corresponding acid", as used in this context, relates to the protonated form of the base.

In particularly preferred embodiments, the base is a non-ionic base which contains nitrogen, which contains a tertiary nitrogen atom and/or an imine nitrogen. Any known non-ionic base which contains nitrogen, which is then capable of deprotonating the ionic compound of formula (I) in the 2-position, can be used.

The term "tertiary", as used herein, indicates that three organic residues are covalently bonded, via single bonds, to the nitrogen atom contained in the at least one non-ionic base.

Alternatively, the at least one non-ionic base can contain an imine nitrogen atom. The term "imine", as used herein, relates to the known class of substances and indicates that the nitrogen atom has a covalent double bond to an organic residue and a covalent single bond to a further organic residue. Imines are Schiff bases.

The catalyst composition of the invention can, in different embodiments, contain several non-ionic bases, for example a base having an imine nitrogen and a base having a tertiary nitrogen atom. The non-ionic base can also be both a tertiary amine and an imine by containing both a tertiary nitrogen atom and an imine nitrogen.

In different embodiments, the at least one non-ionic base is a tertiary amine of (II) $NR_6R_7R_8$ and/or an imine of formula (III) $N(=R_9)R_{10}$.

The residues $R_6$ to $R_8$ and $R_{10}$ are in each case selected independently of one another from the group consisting of substituted or unsubstituted, linear or branched alkyl having 1 to 20 carbon atoms, substituted or unsubstituted, linear or branched alkenyl having 3 to 20 carbon atoms, and substituted or unsubstituted aryl having 5 to 20 carbon atoms, or at least two of $R_6$ to $R_8$, together with the nitrogen atom to which they are bonded, form a 5- to 10-membered, heteroalicyclic ring or heteroaryl ring which optionally contains one or more further nitrogen atoms, in particular 1 further nitrogen atom.

$R_9$ is a substituted or unsubstituted, linear or branched alkylenyl having 3 to 20 carbon atoms or $R_9$ and $R_{10}$, together with the nitrogen atom to which they are bonded, form a 5- to 10-membered, heteroalicyclic ring or heteroaryl ring which optionally contains further nitrogen atoms.

"Alkylenyl", as used herein, relates to an alkyl residue which is bonded to the nitrogen atom via a double bond. If substituted, the substitutes are defined as described above for alkyl residues.

In different embodiments of the invention, the tertiary amine bases or the imine bases are cyclic compounds which contain at least two nitrogen atoms, i.e. at least two of the residues $R_6$-$R_{10}$ combine with another to form a ring, together with the nitrogen atom to which they are bonded, and furthermore contain a further nitrogen atom in the form of a residue —NRR', wherein the nitrogen atom is a ring atom and the residue R or R' is involved in forming the ring. In different embodiments, the bases are for example imidazole derivatives, such as for example 1-alkyl-imidazole or 2,4-dialkyl imidazole, amidine derivatives, such as 1,8-diazabicyclo[5.4.0]undec-7-ene (DBU), or bicyclic tertiary amines, such as 1,4-diazabicyclo[2.2.2]octane (DABCO; triethylene diamine).

In different embodiments, the at least one non-ionic base is selected from the group consisting of 1-methylimidazole, 2,4-ethylmethylimidazole, 1,4-diazabicyclo[2.2.2]octane (DABCO), 1,8-diazabicyclo[5.4.0]undec-7-ene (DBU) and mixtures thereof.

In alternative embodiments, the base can also be selected from alcoholates or lithium alkyl compounds, optionally also in combination with the above-described bases which contain nitrogen.

In different embodiments, the catalyst composition contains a 1-ethyl-3-methyl-1H-imidazolium salt, in particular thiocyanate, and 2,4-ethylmethyl imidazole.

The catalyst composition can contain the at least one ionic compound of formula (I) and the at least one base for example in a weight ratio of 10:1 to 1:10, preferably 3:1 to 1:3 and particularly preferably from 1.1:1 to 1:1.1.

The catalyst composition according to the invention can consist of the aforementioned compounds, i.e. be present, stored or used as a mixture of the two constituents in pure form. However, it is also possible to dissolve the composition in a solvent, in particular an organic solvent. Any solvent which is known and suitable for the purpose according to the invention can be used for this. When using the catalyst composition and in a method in which the composition is used as catalyst, the solvent can be selected according to criteria which relate to the use or method respectively. This criterion can for example be the reaction temperature, the miscibility with other solvents used or the type of educts used. Thus, the solvent can be a high-boiling organic solvent. In a preferred embodiment, the solvent is selected from the group consisting of petroleum, benzene, toluene, xylene, ethylbenzene and mixtures thereof.

In different embodiments, the catalyst compositions of the invention comprise further constituents as are known as such and commonplace in the prior art.

The resins which contain epoxy groups which are cured with the catalyst compositions described herein include any resin known and suitable for the purpose according to the invention. The term "resins", as used herein, comprises monomers, prepolymers and polymers, as well as mixtures of the aforementioned. Suitable resins containing epoxy groups are in particular resins having 1 to 10 epoxy groups per molecule. "Epoxy groups", as used herein, relates to 1,2-epoxy groups (oxiranes). The resin containing epoxy groups can in principle be a saturated, unsaturated, cyclic or acyclic, aliphatic, alicyclic, aromatic or heterocyclic polyepoxide compound. Examples of suitable resins include, but are not limited to, polyglycidyl ethers which are conventionally obtained by conversion of epichlorohydrin or epibromohydrin with polyphenols in the presence of alkali or also polyglycidyl ether from phenol formaldehyde novolac resins, alkyl-substituted phenol-formaldehyde resins (epoxy novolac resins), phenol-hydroxybenzaldehyde resins, cresol-hydroxybenzaldehyde resins, dicyclopentadiene phenol resins and dicyclopentadiene-substituted phenol resins. Polyphenols suitable for this purpose are for example resorcinol, pyrocatechol, hydroquinone, bisphenol A (2,2-bis(4-hydroxyphenyl)propane), bisphenol F (bis(4-hydroxyphenyl)methane), 1,1-bis(4-hydroxyphenyl)isobutane, 4,4-dihydroxybenzophenone, 1,1-bis(4-hydroxyphenyl)ethane and 1,5-hydroxynaphthalene. Diglycidyl ethers of ethoxylated resorcinol (DGER), diglycidyl ethers of resorcinol, pyrocatechol, hydroquinone, bisphenol, bisphenol A, bisphenol AP (1,1-bis(4-hydroxyphenyl)-1-phenylethane), bisphenol F, bisphenol K, bisphenol F, bisphenol S, tetramethyl biphenol and diglycidyl ethers of alkylene glycols with 2 to 20 carbon atoms and poly(ethylene oxide) or poly(propylene oxide)glycols are likewise suitable.

Further suitable resins containing epoxy groups are the polyglycidyl ethers of polyalcohols or diamines. These polyglycidyl ethers are derived from polyalcohols such as ethylene glycol, diethylene glycol, triethylene glycol, 1,2- propylene glycol, 1,4-butylene glycol, triethylene glycol, 1,5-pentane diol, 1,6-hexane diol or trimethylolpropane.

Further suitable resins containing epoxy groups are polyglycidyl esters of polycarboxylic acids which for example can be obtained by reacting glycidol or epichlorohydrin with aliphatic or aromatic polycarboxylic acids such as oxalic acid, succinic acid, glutaric acid, terephthalic acid or dimer fatty acid.

Other suitable resins containing epoxy groups are derived from the epoxidation products of olefinically unsaturated cycloaliphatic compounds or natural oils and fats.

Further suitable epoxy resins are known in the prior art and can for example be found in Lee H. & Neville, K., Handbook of Epoxy Resins, McGraw-Hill Book Company, new edition from 1982.

Preferred compounds containing epoxy groups are aromatic glycidyl ethers, in particular diglycidyl ether, quite particularly preferably those based on aromatic glycidyl ether monomers. Examples thereof are, without limitation, di- or polyglycidyl ethers of polyhydric phenols which can be obtained by reacting a polyhydric phenol with an excess of chlorohydrin, such as e.g. epichlorohydrin. Such polyhydric phenols include resorcinol, bis(4-hydroxyphenyl)methane (bisphenol F), 2,2-bis(4-hydroxyphenyl)propane (bisphenol A), 2,2-bis(4'-hydroxy-3',5'-dibromophenyl)propane, 1,1,2,2-tetrakis(4'-hydroxyphenyl)ethane or condensates of phenols with formaldehyde which are obtained under acid conditions, such as phenol novolacs and cresol novolacs.

Diglycidyl ethers of bisphenol A can be obtained for example as DER 331 (liquid bisphenol A epoxy resin) and DER 332 (diglycidyl ether of bisphenol A) from Dow Chemical Company, Midland, Mich. Although not specifically mentioned, other epoxy resins are used which can also be obtained from Dow Chemical Company under the trade names DER and DEN.

In different embodiments, the compositions which are cured with the catalyst compositions described herein comprise additional constituents as are known as such and commonplace in the prior art.

For example, a modified resin which endows the compositions obtained after curing with an improved impact strength and low temperature properties can be used, for example as a further constituent. Modified resins containing epoxy groups of this type are known in the prior art and comprise reaction products of epoxy resins with an epoxide functionality of more than 1 with carboxy-functional rubbers, dimer fatty acids or so-called core/shell polymers, the cores of which have a glass transition of less than −30° C. The resin containing epoxy groups is used in this case preferably in a stoichiometric excess and produces an epoxide-functional reaction product. The excess of resin containing epoxy groups can also be much more than the stoichiometric excess. An epoxide functionality of more than 1 means that the compounds contain more than 1, preferably at least 2, 1,2-epoxy groups per molecule. Those modified resins which contain epoxy groups which have an epoxide equivalent weight of between 150 and 4000 are advantageous.

Furthermore, at least one part of the resins which contain epoxy groups can be modified, for example with a copolymer of a 1,3-diene or an ethylenically unsaturated comonomer and/or with core/shell rubber particles.

Alternatively or additionally, other tougheners can also be used, such as for example polyols, in particular polyalkylene glycols, such as polypropylene glycol or liquid rubbers. In different embodiments of the invention, the systems to be cured therefore additionally comprise one or more of the above-described tougheners, in particular selected from modified epoxy resins, core/shell rubber (CSR) particles, polyols and liquid rubbers.

The catalyst composition according to the invention is for example suitable for epoxy hybrid resins. In this case, the resin containing epoxy groups can comprise a further polymer, such as for example a polyurethane. In different embodiments, the catalyst composition is particularly suitable for epoxy/polyurethane hybrid resins. In this case it is particularly advantageous if the hybrid resin also has isocyanate groups in addition to epoxy groups. These can then likewise be cross-linked in the subsequent curing reaction, using the catalyst composition. A corresponding hybrid resin can for example contain a resin containing epoxy groups, a polyol and a polyisocyanate. All polyols known in the prior art for polyurethane synthesis are considered, in particular, however, polyether polyols, such as for example polypropylene glycol. Likewise, the polyisocyanates known and commercially available can be used as polyisocyanates, in particular monomeric polyisocyanates, particularly preferably diisocyanates.

The catalyst composition described herein can, furthermore, be used also in particular for producing a cured polymer composition which comprises at least one oxazolidinone ring and at least one isocyanurate ring. Such production methods comprise for example the steps:
(1) providing a reaction mixture comprising
 (a) at least one first compound containing epoxy groups, in particular a liquid aromatic epoxy resin, for example as described above;
 (b) at least one second compound containing isocyanate groups, in particular a liquid aromatic di- or polyisocyanate; and
 (c) a catalyst composition as described herein; and
(2) curing the reaction mixture to obtain a cured polymer composition which comprises at least one oxazolidinone ring and at least one isocyanurate ring.

In one embodiment, the invention is therefore directed also to a method for producing a cured polymer composition which comprises the at least one oxazolidinone ring and at least one isocyanurate ring, wherein the method comprises the steps:
(1) providing a liquid reaction mixture comprising
 (a) at least one liquid, aromatic epoxy resin;
 (b) at least one liquid, aromatic polyisocyanate; and
 (c) a catalyst composition;
 wherein the at least one epoxy resin is used in quantities where epoxy groups are equimolar or in a molar excess relative to the isocyanate groups; and
(2) curing the reaction mixture to obtain a cured polymer composition which comprises at least one oxazolidinone ring and at least one isocyanurate ring.

Hereinafter, the thus-obtainable resins are called epoxy/isocyanate resins.

The second compound containing isocyanate groups contains one or more isocyanate groups and includes every isocyanate known and suitable for the purpose according to the invention and hereinafter is partly also called isocyanate or resin containing isocyanate groups. Suitable compounds containing isocyanate groups are in particular those having 1 to 10, preferably 1-2, isocyanate groups per molecule. The compound containing isocyanate groups can in principle be a saturated, unsaturated, cyclic or acyclic, aliphatic, alicyclic, aromatic or heterocyclic (poly)isocyanate compound. "Isocyanate groups", as used herein, relates to the group —N=C=O. The use of isocyanates with a functionality of two or more can be advantageous, as such polyisocyanates are suitable as cross-linking agents. Suitable resins containing isocyanate groups are methylene diphenyl diisocyanate (MDI), toluene-2,4-diisocyanate (TDI), hexamethylene diisocyanate (HDI), polymeric diphenyl methane diisocyanate (PMDI), isophorone diisocyanate (IPDI), methylene-4,4-bis (cyclohexyl)diisocyanate (H12MDI) and mixtures thereof. These polyisocyanates can for example be obtained under the trade name Desmodur and Desmodur® N3300 from Bayer AG (DE).

Further suitable resins containing isocyanate groups are isocyanates which can be obtained by reacting a primary amine with phosgene.

Other suitable resins containing isocyanate groups are resins which can be obtained by carbonylation of compounds containing nitro groups or primary amines. This carbonylation includes catalytic carbonylation.

Particularly preferred, however, are aromatic polyisocyanate monomers, in particular aromatic diisocyanates such as MDI and TDI.

During curing, the resin containing epoxy groups reacts with the isocyanate in the presence of the catalyst, accompanied by the formation of at least one oxazolidinone which cross-links the resins with one another and, inter alia, endows the cured composition with its advantageous physical properties. The at least one oxazolidinone formed during curing can be one of 1,2-oxazolidine-3-one, 1,2-oxazolidine-4-one, 1,2-oxazolidine-5-one, 1,3-oxazolidine-2-one, 1,3-oxazolidine-4-one or 1,3-oxazolidine-5-one. The cured composition can thus also contain several oxazolidinone isomers different from the aforementioned.

Furthermore, the isocyanate groups react with one another in the presence of the catalyst composition described herein, accompanied by the formation of at least one isocyanurate which cross-links the resins with one another and likewise contributes to the advantageous properties of the cured composition.

The catalyst compositions described herein can be combined with the above-described resins containing epoxy groups and optionally other resins or resin constituents as well as tougheners in the form of an adhesive composition or an injection resin.

Such adhesive compositions or injection resins can contain a plurality of other components known to all persons skilled in the art, including, but not limited to, frequently used auxiliaries and additives, such as for example fillers, plasticizers, reactive and/or non-reactive diluting agents, fluxing agents, coupling agents (e.g. silanes), adhesion promoters, wetting agents, adhesives, flame-proofing agents, wetting agents, thixotropic agents and/or rheological auxiliaries (e.g. fumed silica), ageing inhibitors and/or corrosion inhibitors, stabilizers and/or dyes. Depending on the requirement being placed on the adhesive or on the injection resin and its application, and with regard to the production, flexibility, strength and adhesion to substrates, the auxiliaries and additives are worked into the composition in different quantities.

Therefore, the invention also relates to polymer compositions, i.e. resin compositions which contain at least one resin containing epoxy groups, as defined above, in particular an epoxy/PU hybrid resin or an epoxy/isocyanate resin, as well as the catalyst composition of the invention. This resin composition can be an adhesive composition or an injection resin. The injection resin can preferably be pumped and in particular be a resin which is suitable for the RTM method. In one embodiment, therefore, the invention also relates to the molded parts which can be obtained in the RTM method by means of the resin systems according to the invention. The RTM methods in which the described resin systems (polymer compositions) can be used are known per se in the prior art and can be immediately adapted by a person skilled in the art such that the resins according to the invention can be used.

The open times of the resins which contain the catalyst systems according to the invention are preferably greater than 90 seconds and are particularly preferably in the range of from 2-5 minutes, in particular approximately 3 minutes. "Approximately", as used here in conjunction with a numerical value, means the numerical value ±10%.

The resins cured by means of the catalyst systems and methods described herein can contain a toughener and then preferably have a critical tension intensity factor K1c of >1.2, in particular >1.5. In different embodiments, the glass transition temperature of the resins is in the range of from 120 to 200° C., in particular approximately 170° C. The Young's modulus of the cured resins is preferably 2 to 3 kN/mm$^2$.

Furthermore, the catalyst composition according to the invention is suitable in a method for curing a resin containing epoxy groups, in particular an epoxy/polyurethane hybrid resin or an epoxy/isocyanate resin as described above. For this, depending on the requirement and the resin containing epoxy groups which is to be cured, the quantity of catalyst composition can be varied. In one embodiment, for curing a resin containing epoxy groups, 0.01 to 10 wt.-%, preferably 0.05 to 5 wt.-%, preferably 0.1 to 2 wt.-% of the catalyst composition described herein is used, wherein the weight specifications relate to the overall quantity of the resin containing epoxy groups.

Depending on the requirement of the resin to be cured, the catalyst compositions can be used at different reaction temperatures, for example between 0° C. and 200° C. Generally, the curing conditions can include an increased temperature >25° C., in particular in the range of from 60 to 180° C., preferably in the range of from 90 to 150° C. These temperatures can for example be chosen such that latent accelerators, such as those described above, can be activated.

Therefore, the invention relates also to the use of the catalyst composition according to the invention for curing a resin containing epoxy groups, in particular an epoxy/polyurethane hybrid resin or an epoxy/isocyanate resin.

Furthermore, the invention is directed to a dosing system which comprises (i) a resin containing epoxy groups, in particular an epoxy/polyurethane hybrid resin or an epoxy/isocyanate resin, and (ii) the catalyst composition according to the invention, wherein the catalyst and the resin are contained in separate containers and wherein the dosing system preferably furthermore comprises a dosing device. Dosing can be achieved with manually operated dosing systems but also with fully automatic dosing systems. Examples of such systems are automated volume double gear pumps, twin-screw pump dispensers and drum dispenser systems.

Furthermore, the present invention relates to the cured composition which can be obtained according to the methods described herein. Depending on the method, this may be present as a molded part, in particular as a fiber-reinforced plastic molded part. Such molded parts are preferably used in automotive engineering.

Otherwise, it is self-evident that all embodiments which have been disclosed above in conjunction with the catalyst systems according to the invention can also just as well be applied to the described resin systems, methods and uses, and vice versa.

EXAMPLES

Example 1

Firstly, DER331 (Dow Chemical, liquid epoxy resin of epichlorohydrin and bisphenol A) and PPG2000 (Bayer, polypropylene glycol with Mw 2000) are mixed for 60 seconds (s) at 2000 rpm in the vacuum in the speedmixer. Once the reaction mixture has cooled to room temperature (RT), the imidazolium salt is added and mixing takes place again for 30 s at 2000 rpm in the speedmixer in the vacuum. After cooling again to RT, the non-ionic base is added and then mixing takes place again for 30 s at 2000 rpm. The imidazolium salt and the base are used in a weight ratio of 1:1. The concentrations indicated in the table relate to the sum of both catalysts relative to the overall weight of the reaction mixture. Directly thereafter, Desmodur Vk 5 (Bayer, mixture of monomeric polyisocyanates) is added, and then mixing takes place again for 30 s at 2000 rpm in the vacuum. The obtained resin composition contains 55% epoxy, 5% polyol and 45% isocyanate.

To determine the mechanical properties, the reaction mixture is poured into an upright mold and gelatinized at RT. Thereafter, the mixture is cured in two stages (1 h at 90° C. and 1 h at 150° C.). After cooling, the testpieces required for the mechanical tests are cut out of the plate obtained in this way.

To determine the pot life, the reaction mixture is stored at RT and the gel time is determined manually. The results of the test are summarized in tables 1 and 2. The mechanical statistical values were ascertained in a 200 g batch: Tensile test according to EN ISO 527; 3-point bending according to EN ISO 178; fracture toughness according to IOS 13586; Tg by means of DMTA. The pot life (open time) was determined at RT in a 10 g batch.

TABLE 1

| | 1-methylimidazole | 2-ethyl-4-methylimidazole | DABCO | DBU |
|---|---|---|---|---|
| | | Pot life | | |
| 1H imidazolium, 1-ethyl-3-methyl acetate | 1%-5 min | 1%-3 min | 0.2%-3 min | 0.4%-2 min |
| 1H imidazolium, 1-ethyl-3-methyl thiocyanate | | 2%-<10 min | 0.3%-5 min | 2%-5 min |
| 1H imidazolium, 1-ethyl-3-methyl salt with cyanocyanamide | | | 0.16%-6 min | |
| 1-ethyl-3-ethylimidazolium diethyl phosphate | | | 0.2%-<10 min | 1.4%-5 min |
| no imidazolium salt | 1%-60 min | 1% >18 h | 1%-<5 sec | 1%->18 h |

TABLE 2

| | 1-methyl imidazole | 2-ethyl-4-methyl imidazole | DABCO | DBU |
|---|---|---|---|---|
| | | Mechanical properties | | |
| 1H imidazolium, 1-ethyl-3-methyl acetate | No data | No data | No data | Plate with 0.4% catalyst EN ISO 527/2, 3 Emod: 3070 MPa max: 18 Elongation at break: 0.5 3-point bending Emod: 3160 Fmax: 53 Upsetting: 1.6 K1c: 0.6 |
| 1H imidazolium, 1-ethyl-3-methyl thiocyanate | | Plate with 2% catalyst EN ISO 527/2, 3 Emod: 2980 MPa max: 80.1 Elongation at break: 1.77 3-point bending Emod: 2990 Fmax: 129.7 Upsetting: 5.2 K1c: 1.22 Tg G″: 163 Tg tan delta: 186 | Plate with 0.2% catalyst EN ISO 527/2, 3 Emod: — MPa max: — Elongation at break: — 3-point bending Emod: 3090 Fmax: 69.1 Upsetting: 2.33 K1c: 0.57 Tg G″: Tg tan delta: | Plate with 1% catalyst EN ISO 527/2, 3 Emod: 3050 MPa max: 65.4 Elongation at break: 2.46 3-point bending Emod: 2951 Fmax: 138.3 Upsetting: 6.99 K1c: 1.75 Tg G″: 104/158 Tg tan delta: 178 |

TABLE 2-continued

| | Mechanical properties | | | |
|---|---|---|---|---|
| | 1-methyl imidazole | 2-ethyl-4-methyl imidazole | DABCO | DBU |
| 1H imidazolium, 1-ethyl-3-methyl salt with cyanocyanamide | | | No data | |
| 1-ethyl-3-ethylimidazolium diethyl phosphate | | | Plate with 0.2% catalyst EN ISO 527/2, 3 Emod: 3126 MPa max: 36.7 Elongation at break: 36.7 3-point bending Emod: 3090 Fmax: 69.1 Upsetting: 2.33 K1c: 0.57 Tg G": 64 Tg tan delta: 123 | Plate with 0.2% catalyst EN ISO 527/2, 3 Emod: 3030 MPa max: 43 Elongation at break: 1.2 3-point bending Emod: 2980 Fmax: 144 Upsetting: 7.6 K1c: 1.6 Tg G": 162 Tg tan delta: 183 |
| no imidazolium salt | Plate with 1% catalyst EN ISO 527/2, 3 Emod:. 2808 MPa max: 90.1 Elongation at break: 6.07 3-point bending Emod: 2776 Fmax: 130.1 Upsetting: 6.88 K1c: 2.17 Tg G": 163 Tg tan delta: 179 | Plate with 1% catalyst EN ISO 527/2, 3 Emod: 2797 MPa max: 87.6 Elongation at break: 4.80 3-point bending Emod: 2728 Fmax: 130.2 Upsetting: 7.06 K1c: 2.41 Tg G": 67/160 Tg tan delta: 69/178 | Mixture with 1% catalyst cures too quickly to produce a testpiece | Plate with 1% catalyst EN ISO 527/2, 3 Emod: 2631 MPa max: 85.7 Elongation at break: 6.43 3-point bending Emod: 2461 Fmax: 120.2 Upsetting: 6.83 K1c: 3.09 Tg G": 161 Tg tan delta: 176 |

What is claimed is:

1. A polymer composition comprising (A) an epoxy/polyurethane hybrid resin having isocyanate groups in addition to epoxy groups and comprising a) a resin containing epoxy groups selected from the group consisting of di- and polyglycidyl ethers of bisphenol A, b) a polpropylene glycol, and c) a polyisocyanate selected from the group consisting of methylene diphenyl diisocyanate (MDI), polymeric diphenyl methane diisocyanate (PMDI), and mixtures thereof and (B) a catalyst composition comprising:
   (i) at least one ionic compound
   selected from the group consisting of 1-ethyl-3-methyl-1H-imidazolium acetate; 1-ethyl-3-methyl-1H-imidazolium thiocyanate; 1-ethyl-3-methyl-1H imidazolium cyanocyanamide; 1-ethyl-3-methyl-1H-imidazolium diethyl phosphate and mixtures thereof; and
   (ii) at least one non-ionic base which contains nitrogen and which is selected from the group consisting of 1-methylimidazole, 2,4-ethylmethylimidazole 1,4-diazabicyclo[2.2.2]octane (DABCO), 1,8-diazabicyclo[5.4.0]undec-7-ene (DBU) and mixtures thereof and which is capable of deprotonating the ionic compound in the 2-position;
   wherein a) the catalyst composition is selected such that the epoxy/polyurethane hybrid resin cures in not less than 1 minute and not more than 30 minutes, b) 0.01 to 10 wt-% of the catalyst composition, relative to the overall quantity of resin containing epoxy groups, is present, and c) the catalyst composition contains the at least one ionic compound and the at least one non-ionic base in a weight ratio of 3:1 to 1:3.

2. The polymer composition according to claim 1, having a weight ratio of the at least one ionic compound to the at least one base in a range of from 1.1:1 to 1:1.1.

3. The polymer composition according to claim 1, wherein the polymer composition further comprises a solvent selected from the group consisting of petroleum, benzene, toluene, xylene, ethylbenzene and mixtures thereof.

4. The polymer composition according to claim 1, wherein the catalyst composition is selected such that pot life ranges from greater than 90 seconds to approximately 6 minutes.

5. A fiber-reinforced molded part comprised of a cured composition obtained from the polymer composition of claim 1.

6. A method for curing an epoxy/polyurethane hybrid resin having isocyanate groups in addition to epoxy groups and comprising a) a resin containing epoxy groups selected from the group consisting of di- and polyglycidyl ethers of bisphenol A, b) a polypropylene glycol, and c) a polyisocyanate selected from the group consisting of methylene diphenyl diisocyanate (MDI), polymeric diphenyl methane diisocyanate (PMDI), and mixtures thereof, wherein the method comprises a step of contacting the epoxy/polyurethane resin with a catalyst composition under conditions which enable curing and wherein the catalyst composition comprises:
- (i) at least one ionic compound selected from the group consisting of 1-ethyl-3-methyl-1H-imidazolium acetate; 1-ethyl-3-methyl-1H-imidazolium thiocyanate; 1-ethyl-3-methyl-1H imidazolium cyanocyanamide; 1-ethyl-3-methyl-1H-imidazolium diethyl phosphate and mixtures thereof; and
- (ii) at least one non-ionic base which contains nitrogen and which is selected from the group consisting of 1-methylimidazole, 2,4-ethylmethylimidazole, 1,4-diazabicyclo[2.2.2]octane (DABCO), 1,8-diazabicyclo[5.4.0]undec-7-ene (DBU) and mixtures thereof and which is capable of deprotonating the ionic compound in the 2-position;
- wherein a) 0.01 to 10 wt.-% of the catalyst composition, relative to the overall quantity of resin containing epoxy groups, is used, and b) the catalyst composition contains the at least one ionic compound and the at least non-ionic base in a weight ratio of 3:1 to 1:3.

7. A cured polymer composition comprising at least one oxazolidinone ring and at least one isocyanurate ring, wherein the cured polymer composition is obtained by the method of claim 6.

8. The method of claim 6, wherein the method comprises steps of:
1) providing a reaction mixture comprising (a) the resin containing epoxy groups; (b) the polypropylene glycol; (c) the polyisocyanate; and (d) the catalyst composition; and
2) curing the reaction mixture to obtain a cured polymer composition which comprises at least one oxazolidinone ring and at least one isocyanurate ring.

9. The method of claim 8, wherein the resin containing epoxy groups is present in quantities such that epoxy groups of (a) are in equimolar proportion or in a molar excess proportion relative to the isocyanate groups of the polyisocyanate.

10. A dosing system, wherein the dosing system comprises:
- (i) an epoxy/polyurethane hybrid resin having isocyanate groups in addition to epoxy groups and comprising a) a resin containing epoxy groups selected from the group consisting of di- and polyglycidyl ethers of polyhydric phenols, b) a polypropylene glycol, and c) a polyisocyanate selected from the group consisting of methylene diphenyl diisocyanate (MDI), polymeric diphenyl methane diisocyanate (PMDI), and mixtures thereof; and
- (ii) a catalyst composition;
- wherein the catalyst composition and the epoxy/polyurethane hybrid resin are contained in separate containers; the dosing system optionally comprising a dosing device;
- and wherein the catalyst composition comprises:
  - (i) at least one ionic compound selected from the group consisting of 1-ethyl-3-methyl-1H-imidazolium acetate; 1-ethyl-3-methyl-1H-imidazolium thiocyanate; 1-ethyl-3-methyl-1H imidazolium cyanocyanamide; 1-ethyl-3-methyl-1H-imidazolium diethyl phosphate and mixtures thereof; and
  - (ii) at least one non-ionic base which contains nitrogen and which is selected from the group consisting of 1-methylimidazole, 2,4-ethylmethylimidazole, 1,4-diazabicyclo[2.2.2]octane (DABCO), 1,8-diazabicyclo 5.4.0 undec-7-ene (DBU) and mixtures thereof and which is capable of deprotonating the ionic compound in the 2-position;
    - wherein the catalyst composition contains the at least one ionic compound and the at least non-ionic base in a weight ratio of 3:1 to 1:3.

\* \* \* \* \*